(12) United States Patent
Richard (10) Patent No.: US 6,781,611 B1
(45) Date of Patent: Aug. 24, 2004

(54) METHOD AND SYSTEM FOR NAVIGATING BETWEEN APPLICATIONS, DOCUMENTS, AND FILES

(75) Inventor: Christian James Richard, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 09/605,641

(22) Filed: Jun. 28, 2000

(51) Int. Cl.[7] .................................................. G09G 5/00
(52) U.S. Cl. ...................................................... 345/779
(58) Field of Search ................................ 345/783, 778, 345/779, 781

(56) References Cited

U.S. PATENT DOCUMENTS

| | | | |
|---|---|---|---|
| 5,265,245 A | | 11/1993 | Nordstrom et al. ......... 395/600 |
| 5,500,929 A | | 3/1996 | Dickinson ................... 395/160 |
| 5,623,679 A | | 4/1997 | Rivette et al. .............. 395/773 |
| 5,623,681 A | | 4/1997 | Rivette et al. .............. 395/788 |
| 5,737,560 A | | 4/1998 | Yohanan ..................... 395/349 |
| 5,877,767 A | | 3/1999 | Yohanan ..................... 345/357 |
| 5,920,313 A | * | 7/1999 | Diedrichsen et al. ........ 345/767 |
| 5,950,214 A | | 9/1999 | Rivette et al. .............. 707/512 |
| 5,995,103 A | * | 11/1999 | Ashe .......................... 345/804 |
| 6,072,486 A | * | 6/2000 | Sheldon et al. ............. 345/835 |
| 6,335,745 B1 | * | 1/2002 | Amro et al. ................. 345/835 |

OTHER PUBLICATIONS

Microsoft Window XP Inside Out, pp. 288–290, Copyright 2001.*
MS Windows NT, Version 4.0; Copyright 1981–1998.*
MS Excel 2000, Version 9.0; Copyright 1985–1999.*
Microsoft Word 2000 (9.0.4402 SR–1).*
IBM Technical Disclosure Bulletin, "User Generated Hypertext Links", vol. 36, No. 10, Oct., 1993.

* cited by examiner

Primary Examiner—Kristine Kincaid
Assistant Examiner—Thanh Vu
(74) Attorney, Agent, or Firm—A. Bruce Clay; Hoffman, Warick & D'Alessandro, LLC (57) ABSTRACT

A user may easily switch between multiple open windows in multiple applications on a computer desktop. A visual indicator is provided on an application button. The indicator is linked to a list of open windows within an application represented by the application button. By interacting with the visual indicator, a desired selection from the list of open windows can be surfaced. The visual indicator may comprise an arrow positioned within the application button. Interaction with the visual indicator may comprise positioning a pointer of a pointing device over the visual indicator on the application button. A user then clicks and holds on the visual indicator with the pointing device. A pop-up menu is surfaced containing the list of open windows within the application represented by the application button. By releasing the pointing device over a desired selection on the list of open windows, the desired selection is presented to the user.

9 Claims, 7 Drawing Sheets

METHOD AND SYSTEM FOR NAVIGATING BETWEEN APPLICATIONS, DOCUMENTS, AND FILES

FIELD OF THE INVENTION

This invention relates in general to computer software, and in particular to an improved method and system for navigating between applications, documents and files that are open on a desktop.

BACKGROUND OF THE INVENTION

Computer systems are becoming more and more complex all the time. As such, it is not unusual for a user to have more than one application, document or file open on a desktop at any one time. Therefore, if a user has more than one application, document or file open, it is likely that the user will need to switch back and forth between them in order to perform various tasks. Currently, when the user wants to switch from one application to another and then select one of several open windows within the new application, it is necessary to utilize several steps. First the user must select the desired application that is open yet not the top and, therefore, visible window. Once the desired application is on top, the user must click on "Window" from a tool bar. A drop down menu will then appear, allowing the user to select the desired window from the list. Finally, the desired window in the desired application is visible for the user to work with.

This prior art method is slow and user intensive. If the user is unsure of whether the desired window is even open, there is no way to find out without going through all the required steps. Therefore, there is a need for an improved method and system for navigating between applications, documents and files that are open on a desktop.

SUMMARY OF THE INVENTION

A method is provided for switching between multiple open windows in multiple applications on a computer desktop. A visual indicator is provided on at least one application button. The indicator is linked to a list of open windows within an application represented by the at least one application button. By interacting with the visual indicator, a desired selection from the list of open windows can be surfaced. The visual indicator may comprise an arrow positioned within the application button. Interaction with the visual indicator may comprise positioning a pointer of a pointing device over the visual indicator on the application button. A user then clicks and holds on the visual indicator with the pointing device. A pop-up menu is then surfaced containing the list of open windows within the application represented by the application button. By releasing the pointing device over a desired selection on the list of open windows, the desired selection is presented to the user.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
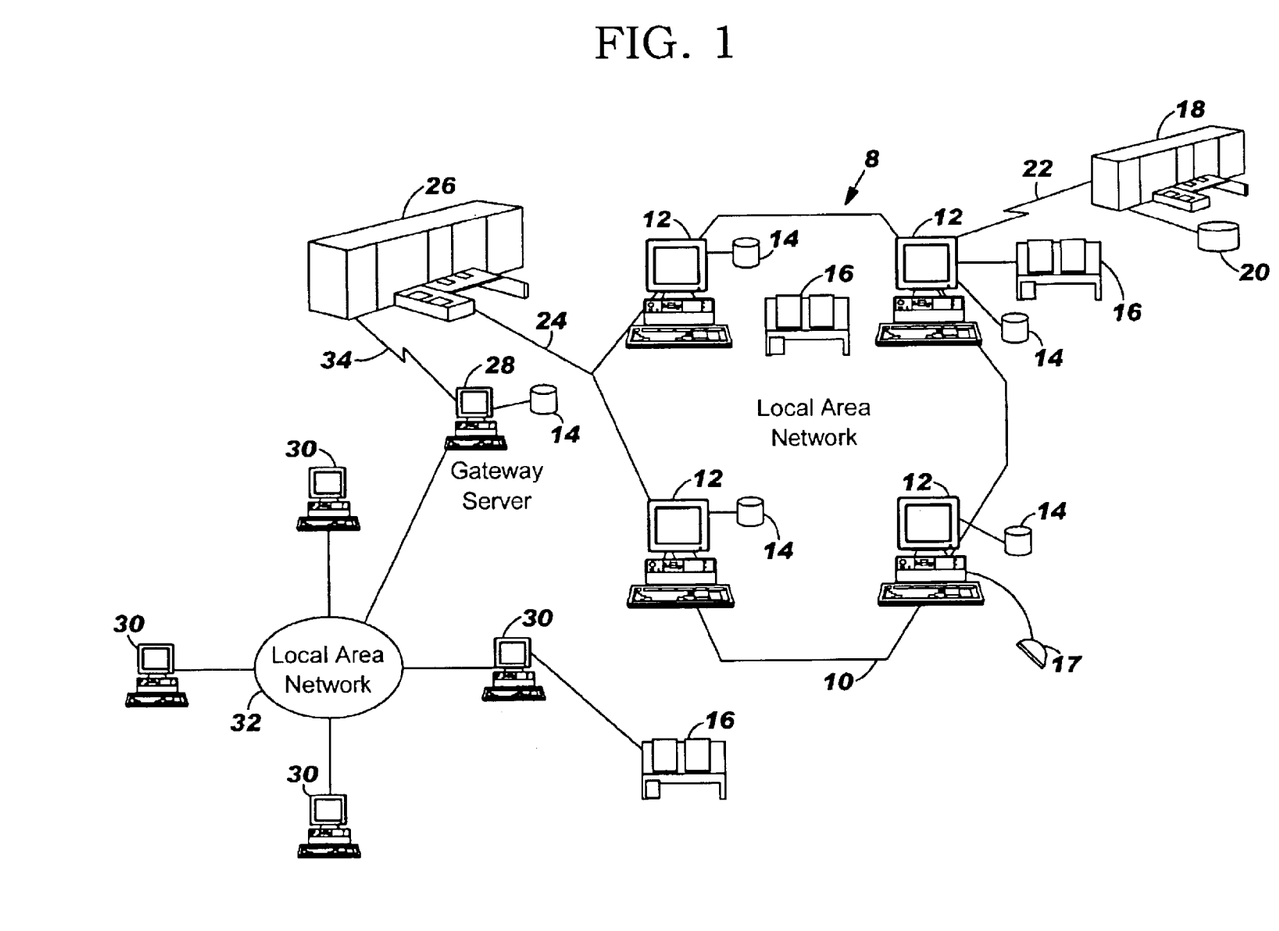
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
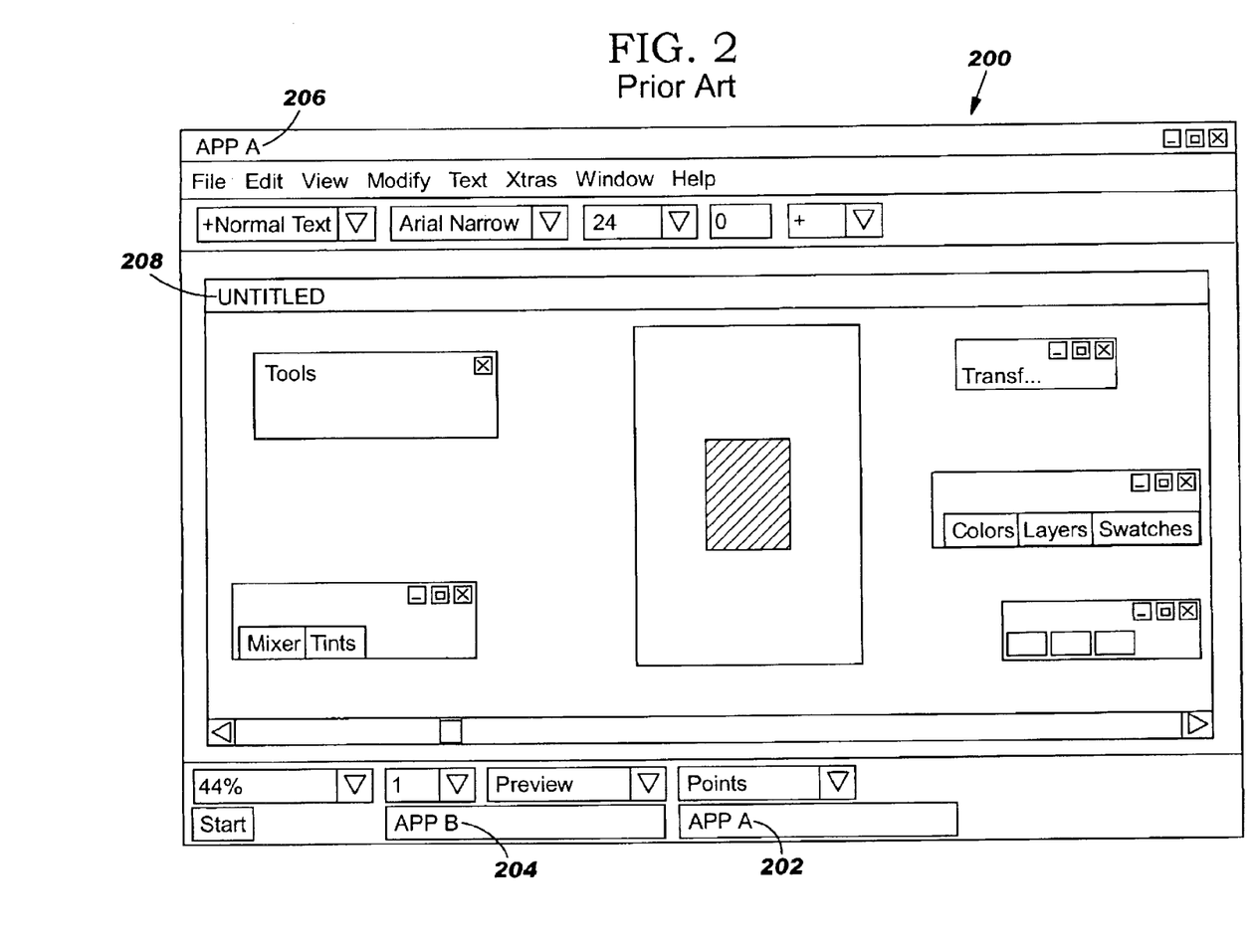
FIGS. 2–4 illustrate an example of the prior art.

In accordance with the prior art, a user has multiple applications and multiple windows therein open on his computer desktop 200, as shown in FIG. 2. There are, for the sake of clarity, only two applications (AppA, as identified by reference numeral 202; and AppB, as identified by reference numeral 204) open on the desktop 200. AppA 202 is currently the window with focus, as can be seen by the title bar 206. AppA 202 is displaying a window (Untitled) 208. Although not shown, it is to be understood that there may be more than one window open but not in focus in AppA 202.

Figure 3:
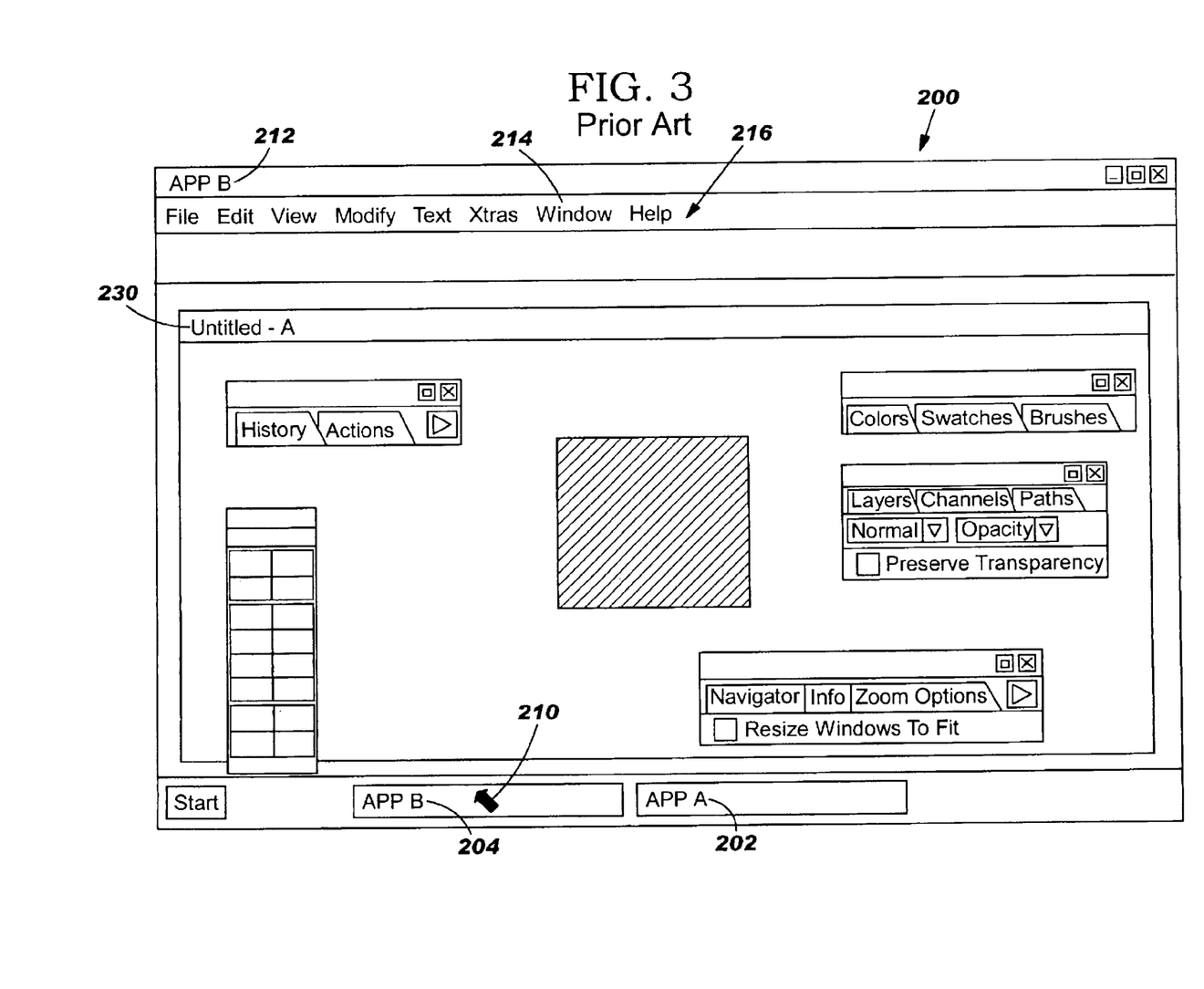

In order for the user to switch between the open applications in accordance with the prior art, the user must first select the desired application. As shown in FIG. 3, the user has selected AppB 204 by clicking thereon with pointer 210. AppB 204, as evidenced by title bar 212, is now on top and in focus with a window (Untitled-A) 230 displayed thereon. Now, if the desired window within AppB 204 is not displayed, the user must select (by clicking with pointer 210 or any other appropriate manner) "Window" 214 from a toolbar 216.

Figure 4:
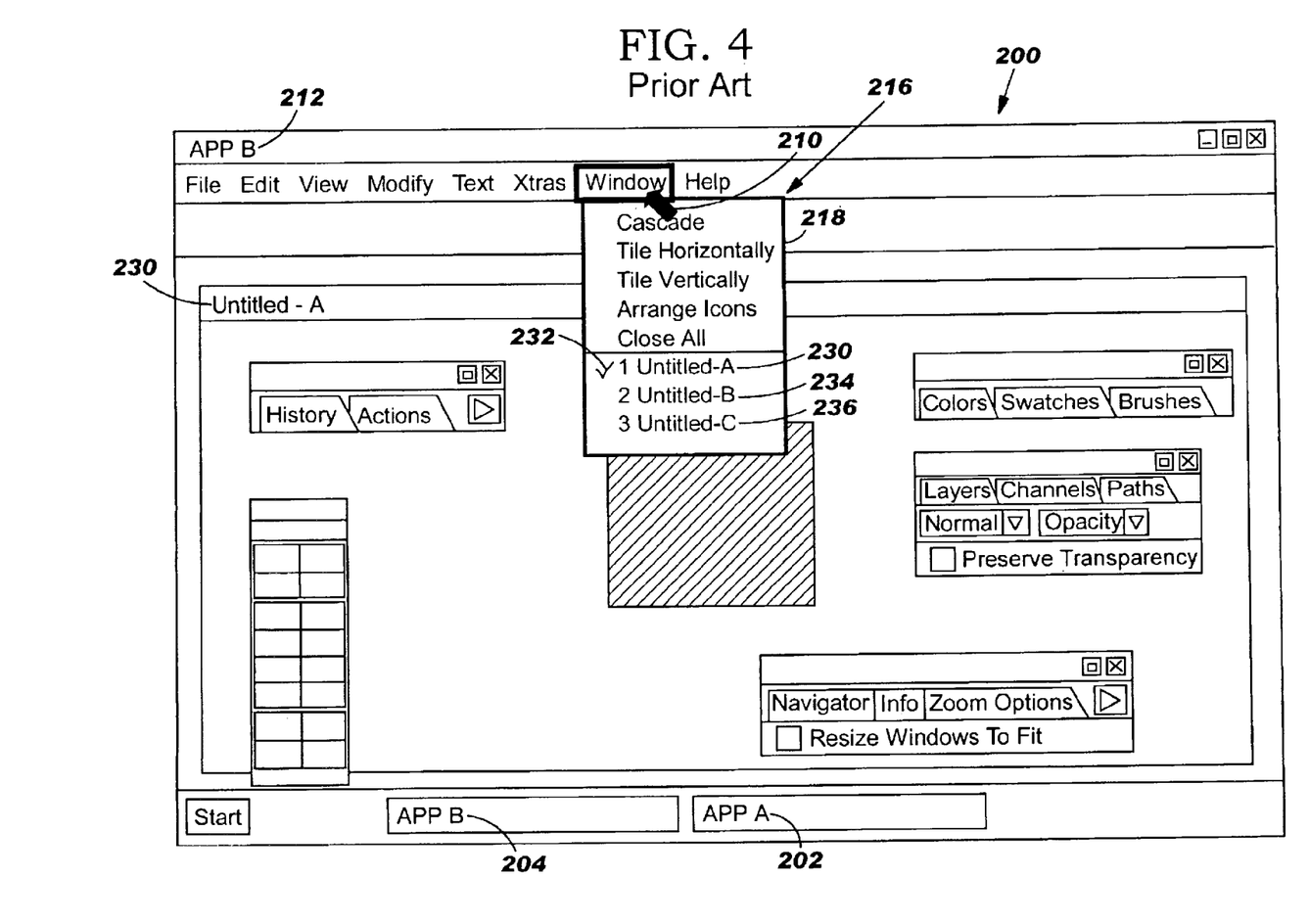

A drop-down menu 218 (see FIG. 4) will appear with a check mark 232 next to the displayed window. As shown in FIG. 4, there are three windows already open (Untitled-A window 230, Untitled-B window 234, and Untitled-C window 236) in AppB 204. Depending upon the user's need, the appropriate window will then be selected from the drop-down menu 218 by clicking thereon with the pointer 210. Thus, the user was required to perform three separate steps to reach the desired window in the desired application.

Figure 5:
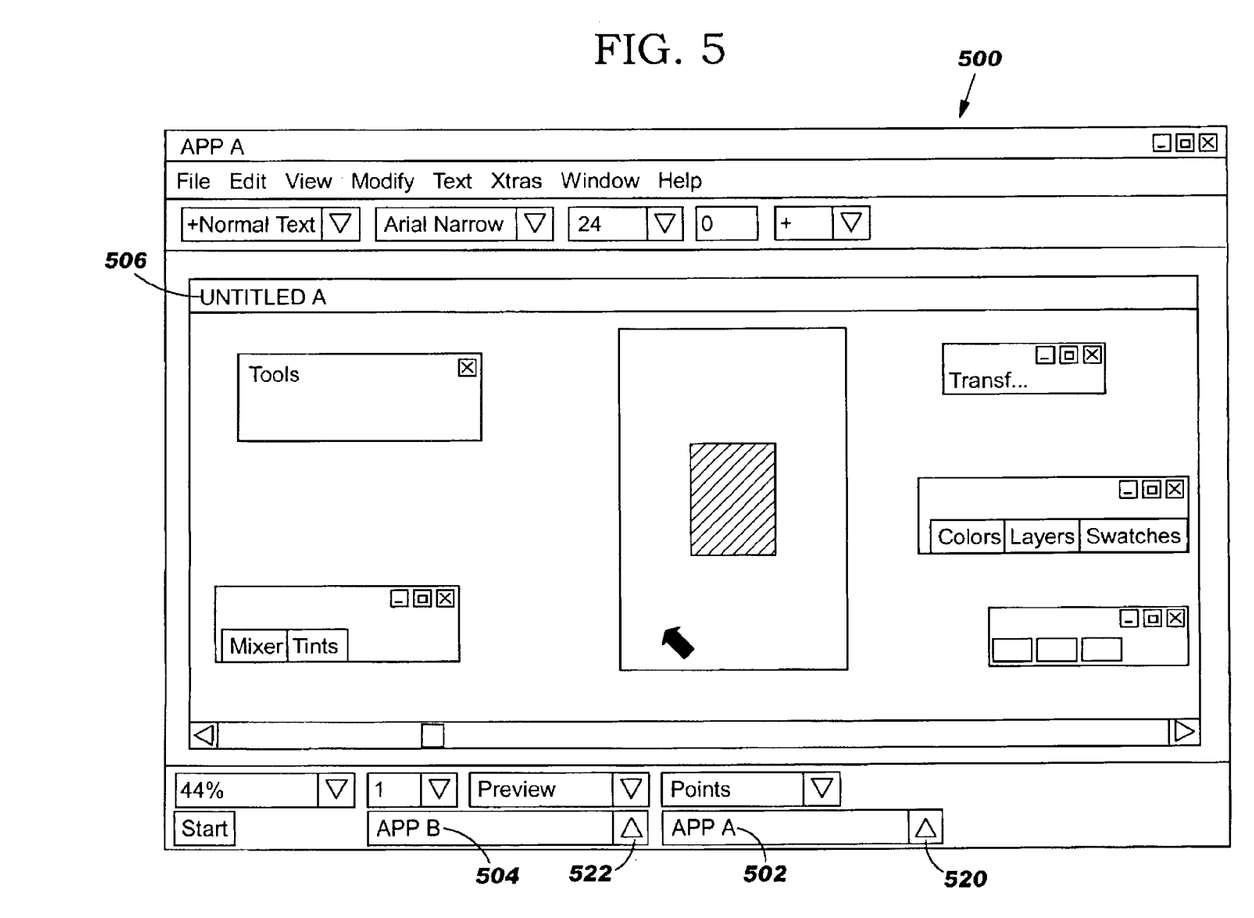
FIGS. 5–7 illustrate an embodiment of the present invention.
Figure 6:
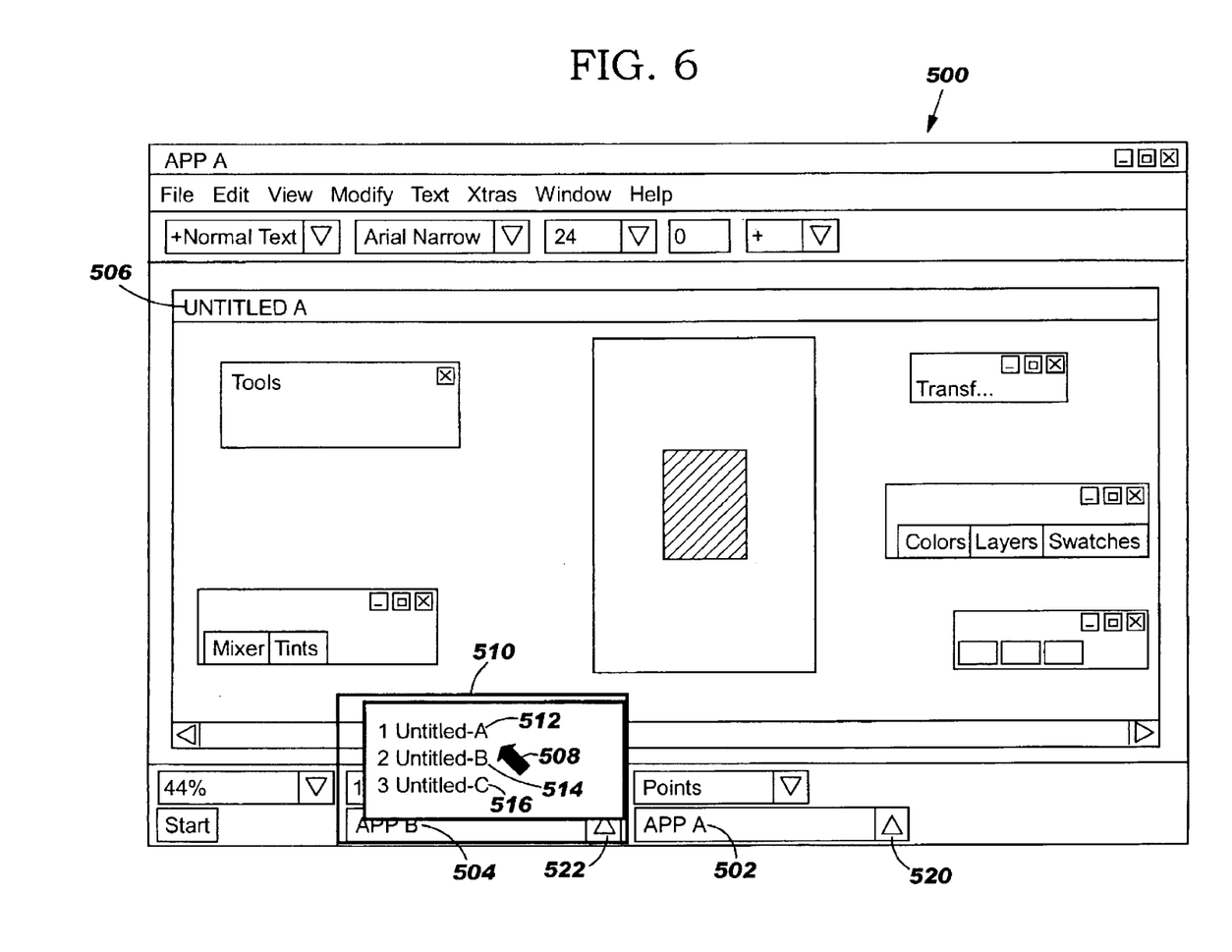
Figure 7:
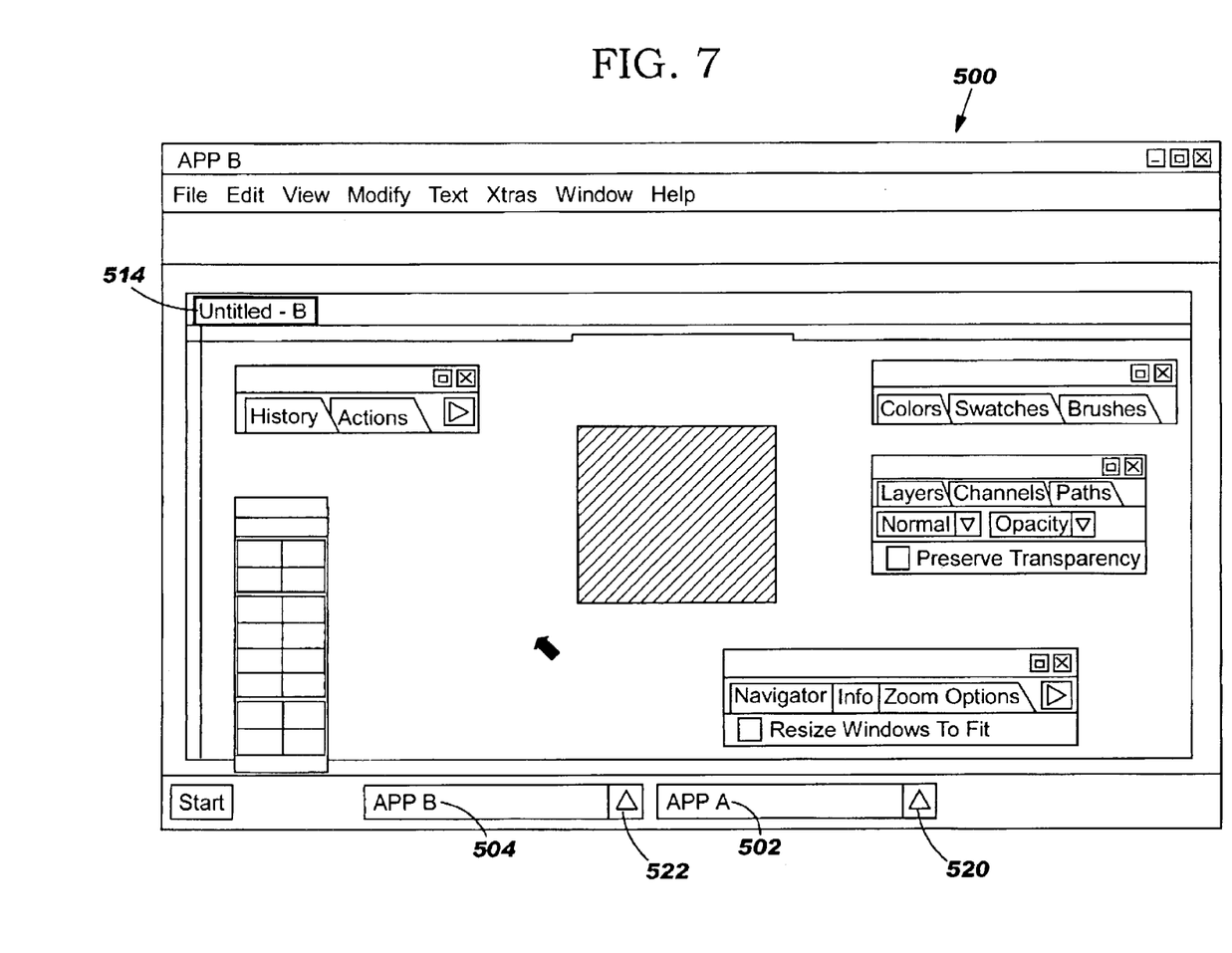

Referring now to FIGS. 5–7, an example is shown in accordance with the present invention. Continuing the example as shown above in FIGS. 2–4, the user has two applications, AppA and AppB (as shown by application button 502 and application button 504, respectively), open on a desktop 500. The current top window is Untitled A 506 of AppA. Unlike the prior art, the application buttons 502 and 504 are also provided with an arrow 520 and 522, respectively, which will be subsequently described in greater detail. Although not shown, it is to be understood that other visual indicators could be used besides the arrows 520 and 522. If the user wants to switch to another window in another application, the present invention provides a quicker, easier method than found in the prior art.

Referring to FIG. 6, the user has clicked and held on the arrow 522 (which serves as a visual indicator that there are a plurality of windows open in AppB) of button 504 with a pointer 508. By so doing, a pop-up menu 510 appears thereon. As in the prior art example above, there are three windows (Untitled-A 512, Untitled-B 514, and Untitled-C 516) open within AppB. The user need only place the pointer 508 over (thus, highlighting the selection) the desired window and release the button on the pointing device (such as mouse 17 in FIG. 1).

As shown in FIG. 7, the user had released the pointer over Untitled-B 514, thus surfacing the Untitled-B 514 window of AppB. Therefore, the user has accomplished in one selection movement the same result as in the previously described prior art example which required three selection movements. The present invention has thus provided a quicker, easier method for switching between applications, windows or files.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. A method of switching focus between a plurality of open windows in a plurality of open applications of which only one of the plurality of open windows in only one of the plurality of open applications may have focus at any one time on a computer desktop, comprising the steps of:

simultaneously displaying a first application button corresponding to a first open application and a second application button corresponding to a second open application on the computer desktop, wherein the first application button and the second application button allow a focus to be switched between the first open application and the second open application;

providing a visual indicator on each of the first application button and the second application button, wherein the visual indicators are separately selectable from the first application button and the second application button, and wherein the visual indicators are linked to lists of open windows within the first open application and the second open application; and interacting with said visual indicator on said second application button to switch the focus from a window open within said first open application to another window open within said second open application.

2. The method of claim 1, wherein said step of providing a visual indicator comprises providing an arrow within said first application button and said second application button.

3. The method of claim 1, wherein said step of interacting with said visual indicator comprises the steps of:

positioning a pointer of a pointing device over said visual indicator on said second application button;

clicking and holding on said visual indicator on said second application button with said pointing device;

surfacing a pop-up menu containing said list of open windows within said second open application; and releasing said pointing device over a desired selection on said list of open windows.

4. A system for switching focus between a plurality of open windows in a plurality of open applications of which only one of the plurality of open windows in only one of the plurality of open applications may have focus at any one time on a computer desktop, comprising:

means for simultaneously displaying a first application button corresponding to a first open application and a second application button corresponding to a second open application on the computer desktop, wherein the first application button and the second application button allow a focus to be switched between the first open application and the second open application;

means for providing a visual indicator on each of the first application button and the second application button, wherein the visual indicators are separately selectable from the first application button and the second application button, and wherein the visual indicators are linked to lists of open windows within the first open application and the second open application; and means for interacting with said visual indicator on said second application button to switch the focus from a window open within said first open application to another window open within said second open application.

5. The system of claim 4, wherein said means for providing a visual indicator comprises means for providing an arrow within said first application button and said second application button.

6. The system of claim 4, wherein said means for interacting with said visual indicator comprises:

means for positioning a pointer of a pointing device over said visual indicator on said second application button;

means for clicking and holding on said visual indicator on said second application button with said pointing device;

means for surfacing a pop-up menu containing said list of open windows within said second open application; and means for releasing said pointing device over a desired selection on said list of open windows.

7. A computer program product recorded on computer readable medium for switching focus between a plurality of open applications of which only one of the plurality of open windows in only one of the plurality of open applications may have focus at any one time on a computer desktop, comprising:

computer readable means for simultaneously displaying a first application button corresponding to a first open application and a second application button corresponding to a second open application on the computer desktop, wherein the first application button and the second application button allow a focus to be switched between the first open application and the second open application;

computer readable means for providing a visual indicator on each of the first application button and the second application button, wherein the visual indicators are separately selectable from the first application button and the second application button, and wherein the visual indicators are linked to lists of open windows within the first open application and the second open application; and     computer readable means for interacting with said visual indicator on said second application button to switch the focus from a window open within said first open application to another window open within said second open application.

8. The program product of claim 7, wherein said computer readable means for providing a visual indicator comprises computer readable means for providing an arrow within said first application button and said second application button.

9. The program product of claim 7, wherein said computer readable means for interacting with said visual indicator comprises:

computer readable means for positioning a pointer of a pointing device over said visual indicator on said second application button;

computer readable means for clicking and holding on said visual indicator on said second application button with said pointing device;

computer readable means for surfacing a pop-up menu containing said list of open windows within said second open application; and     computer readable means for releasing said pointing device over a desired selection on said list of open windows.

* * * * *